United States Patent
Wineberg et al.

(10) Patent No.: US 6,282,283 B1
(45) Date of Patent: Aug. 28, 2001

(54) OPTIMIZATION OF AGENT TRANSFERS IN CALL BLENDING

(75) Inventors: Jonathan M. Wineberg, Leesburg; Neil D. Pundit, Herndon; Arunachalam Ravichandran, Leesburg, all of VA (US)

(73) Assignee: SER Solutions, Inc., Herndon, VA (US)

( * ) Notice: Subject to any disclaimer, the term of this patent is extended or adjusted under 35 U.S.C. 154(b) by 0 days.

(21) Appl. No.: 09/182,430

(22) Filed: Oct. 30, 1998

Related U.S. Application Data

(63) Continuation-in-part of application No. 09/143,536, filed on Aug. 28, 1998.

(51) Int. Cl.$^7$ .......................... H04M 3/523; H04M 3/44; H04Q 3/64

(52) U.S. Cl. .......................... 379/265; 379/216
(58) Field of Search .................. 379/216, 265, 379/266, 309

(56) References Cited

U.S. PATENT DOCUMENTS

| | | | |
|---|---|---|---|
| 5,185,780 | * 2/1993 | Leggett | 379/265 X |
| 5,214,688 | * 5/1993 | Szlam et al. | 379/265 X |
| 5,519,773 | * 5/1996 | Dumas et al. | 379/266 X |
| 5,815,566 | * 9/1998 | Ramot et al. | 379/309 X |

* cited by examiner

*Primary Examiner*—Harry S. Hong
(74) *Attorney, Agent, or Firm*—Andrew C. Aitken; Venable

(57) ABSTRACT

A call center blending system in which the look ahead interval is variable and is equal to the average time an agent is engaged in an outbound call, including after call wrap-up work.

2 Claims, 1 Drawing Sheet

OPTIMIZATION OF AGENT TRANSFERS IN CALL BLENDING

This is a continuation in part of application Ser. No. 09/143,536 filed Aug. 28, 1998 entitled Call Center Inbound/Outbound Balance System.

BACKGROUND OF THE INVENTION

1. Field of the Invention

This invention relates to a method for optimizing the transfer of agents in a call center between inbound and outbound functions to meet changes in inbound call load, and more particularly to a method for determining a forward interval at the end of which inbound agent requirements will be predicted and a method for timing the start of transfers to meet these requirements.

2. Description of the Prior Art

Many call centers have both inbound and outbound operations. The inbound operation is reactive to the calls coming in. If more than anticipated calls come in, then additional agents are needed. If less than anticipated calls come then some agents would be idle. In contrast, the outbound operation is proactive as the pacing algorithm can launch enough calls to keep all agents busy. The desire to enhance the productivity of a call center in spite of the peaks and valleys in incoming call volume has led to blending algorithms in which a subset of agents (blend agents), who can handle either inbound or outbound calls, are transferred back and forth between inbound and outbound. U.S. Pat. No. 5,425,093, assigned to the assignee of this application, and incorporated therein by reference, describes a system in which blend agents are transferred between inbound and outbound functions.

The blending algorithm described in the co-pending application Ser. No. 09/143,536 estimates the incoming call volume at a fixed future time and requests an appropriate number of dual agents to be transferred.

While generally satisfactory, these and other prior art systems, in executing the transfer requests called for by a blending algorithm, have two possible errors. One error is that the number of dual agents actually transferred may be less than what was requested. This is true if the look-ahead time is not large enough. The second error occurs in the time of actual transfer. Transfer occurs only when a dual agent becomes available after completing his or her current task. Thus, some agents may be transferred earlier and some later than the optimum time of transfer.

SUMMARY OF THE INVENTION

An object of this invention is the minimization of the errors associated with executing the blending requests by which dual agents are moved from outbound to inbound and inbound to outbound.

Another object of the invention is its applicability to any system of blending regardless of the software, hardware, and any other details.

Briefly, this invention contemplates a call center blending system in which the look ahead interval is variable and is equal to the average time an agent is engaged in an outbound call, including after call wrap up work.

BRIEF DESCRIPTION OF THE DRAWINGS

The foregoing and other objects, aspects and advantages will be better understood from the following detailed description of a preferred embodiment of the invention, in which.

DETAILED DESCRIPTION OF A PREFERRED EMBODIMENT

As will be appreciated by those skilled in the art, there are different criteria for blending in call centers whereby a subset of agents, called dual agents, who can handle outbound as well as inbound functions, are moved from outbound to inbound and vice versa. The criteria can be keeping the inbound wait time at a desired level, or controlling the inbound queue length, or some variation thereof. As taught in Ser. No. 09/143,536, the transfer algorithm looks ahead into the future based on the current and the past data of the incoming call volume. The outcome of the blending algorithm is that a certain number of dual agents are moved from outbound to inbound (or inbound to outbound) at a future time. These computations are repeated periodically.

Figure 1:
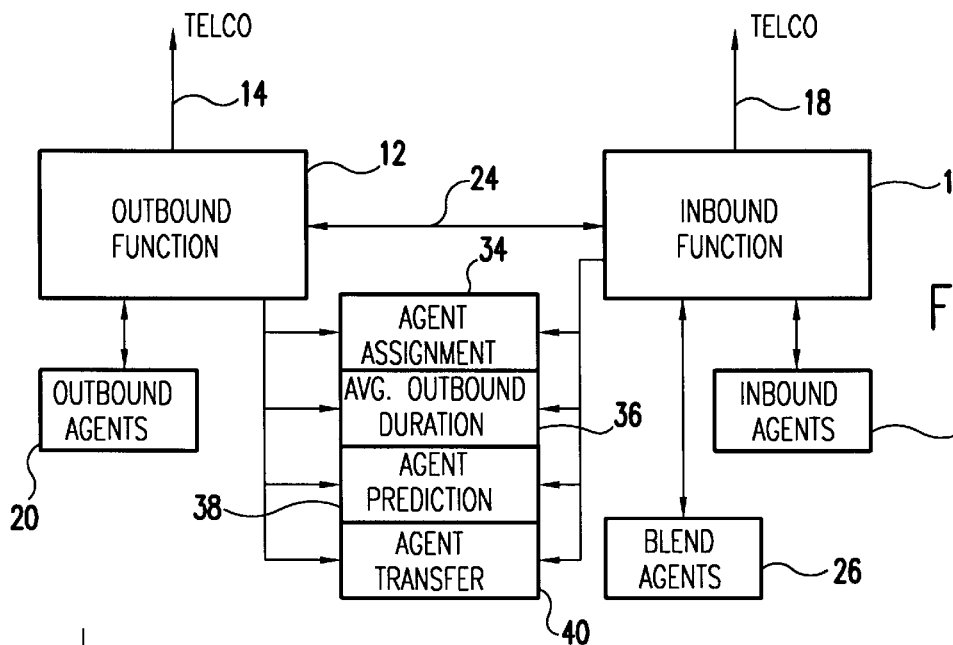
FIG. 1 is a functional block diagram of a call center with the software and hardware functional applications for the invention.

Referring now to FIG. 1, it illustrates functionally a typical call center such as, for example, that described in more detail in the U.S. Pat. No. 5,425,093. It includes an outbound function 12 connected to telco trunks 14 and an inbound function 16 connected to telco trunks 18. The outbound function 12 has assigned outbound agents 20 and the inbound function has assigned agents 22. Blend agents 26 are in this illustrative embodiment connected to the inbound function and when assigned to outbound coupled to the outbound function 12 through link 24. It will be appreciated that this invention is not limited to this or any other specific call center algorithm. A commercially available call center processor or processors maintain records of call center operation, and perform various calculations, including predicting the number of agents that will be required to meet the demands of the incoming call volume. The processor maintains a record 34 of the assignment of blend agents including the number assigned to inbound and outbound functions respectively. A processor application 36 receives input data from the outbound function of the duration of outbound calls including the agent post call wrap up work and calculates periodically the average duration agents are engaged in an outbound call. The call center processor also includes an application 38 that determines the number of agents that will be needed to meet a predicted in-bound load at the end of a future time interval. The basic method taught in the application Ser. No. 09/143,536 is one example of a suitable application 38. It will be appreciated that the teachings of this invention are applicable to those blending algorithms generally which predict a number of agents at the end of some future interval required to meet a predicted inbound call load. The call center processor also includes an application 40 that transfers agents from outbound to inbound or inbound to outbound depending on the results of the blending application 38.

Figure 2:
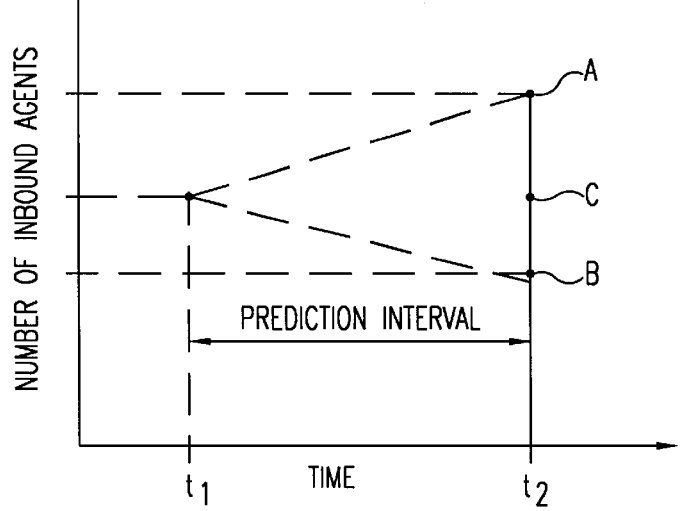
FIG. 2 is a diagram graphically illustrating the look-ahead interval.

FIG. 2 graphically represents the prediction interval. At time t1 a prediction is made as to the number of agents that will be necessary to meet the predicted inbound call load at the end t2 of the prediction interval. In accordance with the teachings of this invention, the prediction interval varies as the average time that an agent is engaged in an outbound call and in the preferred embodiment the prediction interval is substantially equal to the average time agents are engaged in an outbound call. An agent is considered engaged in an outbound call from the time the call is switched to the agent until the call is complete and the agent completes any wrap up work for the completed call and is available to receive another call. FIG. 2 illustrates the three possible cases; A where the number of agents required to meet the predicted inbound load is greater than the presently assigned number of agents; B where the required number is less than the presently assigned number; and C where the number of agents is unchanged. In case A blend agents are transferred from outbound to inbound. In case B agents are transferred from inbound to outbound and in case C blend agents are not transferred.

First consider that the dual agents are being transferred from outbound to inbound to meet the anticipated higher demand on the inbound. On the outbound, although the agents become free after completing a call, the pacing algorithm launches calls in anticipation to keep all agents busy. In any case, the actual time of transfer will be a random variable with an average value as the service duration of the outbound call (including the wrap up time). If the look-ahead time equals the average outbound call service duration, then each timing error associated with executing the transfer will be minimized with zero-mean. Furthermore, as the error associated with each agent is minimized, it does not matter how few or how many agents are transferred.

Consider a transfer from inbound to outbound. The agents on the inbound will continually be free after completing the call on hand. However, the calls arriving are totally independent of the number of agents. An argument similar to that in the last paragraph would conclude that look-ahead time should be the average call service duration on the inbound. However, the outbound pacing computations are done every second (or very often) and an early transfer to outbound can be gainfully utilized. The late transfers should, of course, be avoided. Generally, the duration of inbound calls is much larger than that of the outbound. Therefore, keeping the look-ahead time the same as average outbound call service duration would be more appropriate if the required number of dual agents become free in the interval. In case fewer than the required number of dual agents are actually transferred, this information can be incorporated in the next computation cycle. The number of the dual agents in relation to the total number of agents for inbound or outbound does not enter into the picture.

In summary, this invention contemplates that the look-ahead time is equal to the average call service duration on the outbound. If the average call service time on inbound is equal to or smaller than that of the outbound, then there is no problem. If the average call service duration on the inbound is greater than that of the outbound then it is possible that a sufficient number of dual agents may not become free to move from inbound to outbound. In such a case, the next computation cycle would account for it.

The transfer of blend agents should be started some time between the time of the prediction and of the look-ahead period, in such a way that only the required number of agents are transferred at the end of the look-ahead period. To define this precisely, T=[d0−r·d], where T is the time after t1 in FIG. 2 to begin transfer. The minimum value of T is zero (i.e., now), and the maximum value is d0, where d0 is the outbound service duration. The term r is the ratio of the dual agents to be transferred; if the transfer is from inbound to outbound then the ratio, r, is the number of dual agents on the inbound to be transferred to the total number of dual agents on the inbound, and d is the service duration on inbound. If the transfer is from outbound to inbound then the r and d would pertain to outbound.

This derivation is based on the assumption that the rate at which the agents complete their current assignment is uniformly distributed over the interval of the service duration. For example, if the service duration is 60 seconds, and the total number of agents is 60 then one agent is becoming free every second on the average. It is quite possible that in certain cycles this may not be true because of random variations. In any case, tally should be kept of the exact number of agents actually transferred, so that the updated information is used for the next look-ahead.

In transferring from inbound to outbound, if the inbound service duration is larger than that of the outbound (which is more likely the case) then it is possible that the required number of agents may not be freed. And, by the same token, if the appropriate number of agents are transferred then further transfer should be stopped. In any case, the updated actual numbers should be used for the next cycle of computation.

Figure 3:
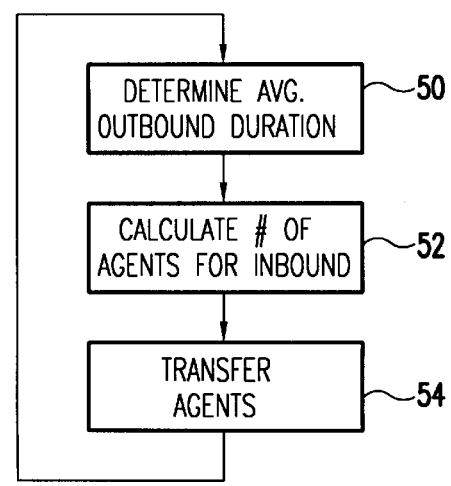
FIG. 3 is a flow diagram of the steps of the invention.

FIG. 3 is a flow chart of the steps of the invention. The average outbound call duration is determined periodically at block 50. The number of agents required to meet the predicted inbound demand at the end of the interval is calculated in block 52. Agents are transferred in accordance with the calculation in block 54.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for determining a number of call center agents to transfer between concurrently running inbound and outbound functions, including the steps of:

determining the average duration agents assigned to the outbound function are engaged in outbound calls;

calculating at a time $t_1$ a number of agents that will be needed to meet a predicted inbound call load at a time $t_2$ that is the end of an interval after $t_1$, which interval is a function of the average duration determined in said determining step;

said calculating step including a step projecting a trend determined by at least two samples of the inbound call load.

2. A method for determining a number of call center agents to transfer between concurrently running inbound and outbound functions, including the steps of:

determining the average duration agents assigned to the outbound function are engaged in outbound calls;

calculating at a time $t_1$ a number of agents that will be needed to meet a predicted inbound call load at a time $t_2$ that is the end of an interval after $t_1$, which interval is a function of the average duration determined in said determining step;

said calculating step including a step projecting a trend determined by at least two samples of the inbound call load;

calculating when to begin transfer of said number of agents; and determining a start to a new cycle of determining a number of call center agents to transfer between inbound and outbound functions.

* * * * *